Jan. 15, 1946.    G. H. WOLFE    2,392,872
GAS CLEANER APPARATUS
Filed April 27, 1943    2 Sheets-Sheet 1

INVENTOR
GEORGE H. WOLFE
BY Darby & Darby
ATTORNEYS

Jan. 15, 1946.   G. H. WOLFE   2,392,872
GAS CLEANER APPARATUS
Filed April 27, 1943   2 Sheets-Sheet 2
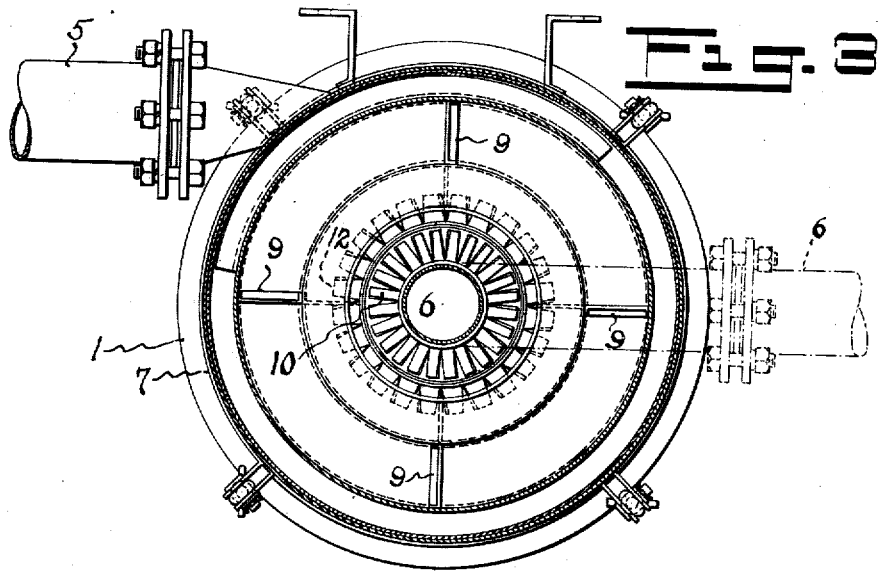
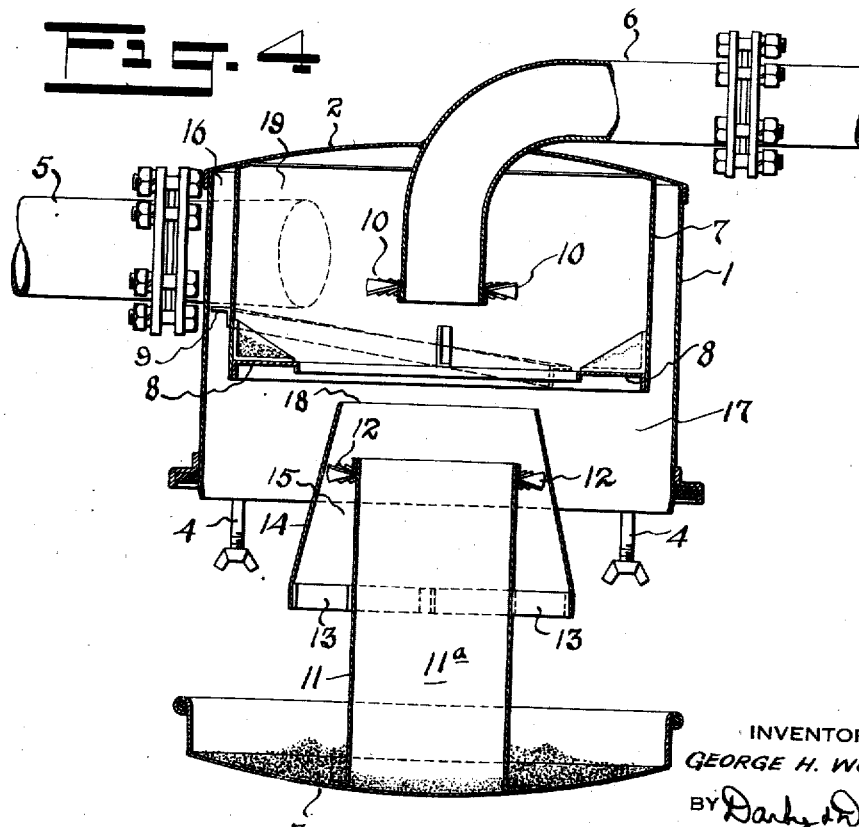
INVENTOR
GEORGE H. WOLFE
BY Darby & Darby
ATTORNEYS Patented Jan. 15, 1946

2,392,872

UNITED STATES PATENT OFFICE 2,392,872

GAS CLEANER APPARATUS

George H. Wolfe, Brooklyn, N. Y., assignor to Dorothy E. McKenzie, Reno, Nev.

Application April 27, 1943, Serial No. 484,723

5 Claims. (Cl. 183—84)

The invention relates to a gas cleaner apparatus and more particularly to a gas cleaner apparatus which is adapted for use in a gas producer apparatus of the type designed for use on board of an automotive vehicle such as is described in Letters Patent No. 2,278,798, issued April 7, 1942, to A. Riccardi, and which is used to generate and supply combustible gas to the internal combustion engine of said vehicle.

One object of the invention is to provide a gas cleaner apparatus wherein large quantities of dust or dirt, contained in the gas cleaned, can be collected in the apparatus before servicing of the apparatus becomes necessary.

Another object of the invention is the provision of a gas cleaner apparatus wherein large quantities of dust or dirt may be collected therein without impairing the cooling benefits derived from the exterior surfaces of the apparatus.

Another object of the invention is the provision of a gas cleaner apparatus which when used as a preliminary cleaner on a gas producer apparatus of the type above referred to, it will, when in operation, lower the temperature of the gas flowing through the same and at the same time remove a major part of the suspended solids in the gas, and thus reduce the amount of work that is required to be performed by the final cleaner apparatus used.

The attached drawings show by way of example the form of construction of my gas cleaner apparatus according to my invention, in which drawings—

Figure 3 is a horizontal sectional view.

Figure 4 is a sectional view similar to Figure 2 but showing the bottom partially removed from the body of the apparatus.

Figure 1:
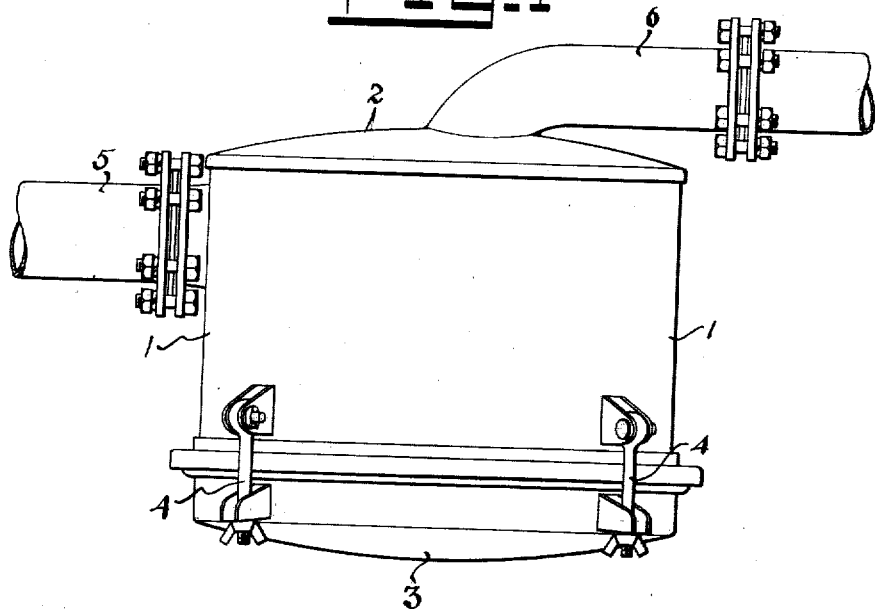
Figure 1 is a side elevation of the cleaner apparatus.
Figure 2:
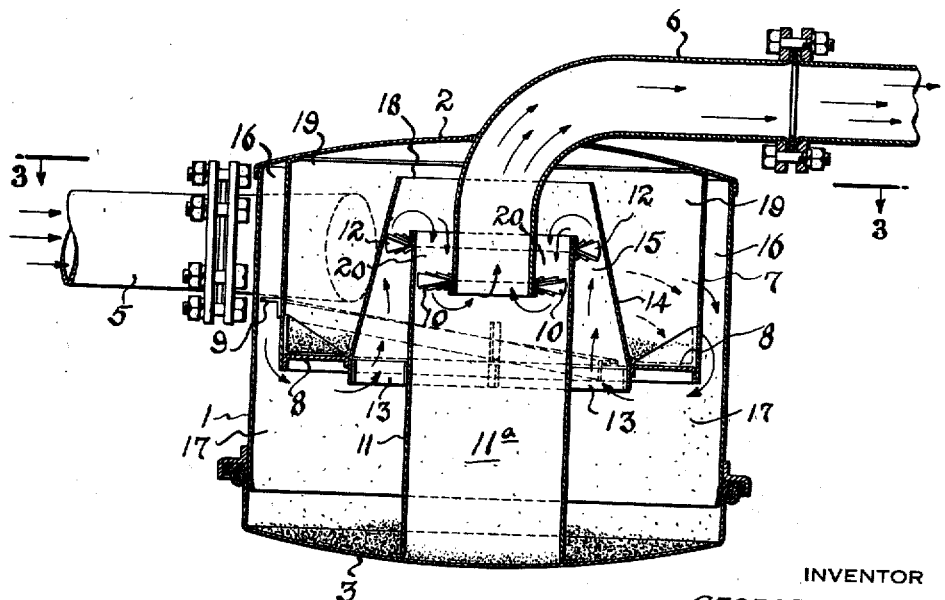
Figure 2 is a vertical sectional view of the apparatus.

Referring more particularly to the drawings, the gas cleaning separator housing is generally indicated at 1. The housing is preferably made of a light gage steel metal and in the form of a cylinder. The cylinder is provided with a top 2 which is welded or fastened thereto to form an airtight joint. The separate housing is provided with a removable bottom portion 3 which is adapted to have a detachable airtight joinder with the sides of the chamber. This joinder of the bottom portion 3 with the separator housing is kept airtight by means of any appropriate fittings joinder of the bottom portion airtight with the housing, suitable gasket material such as asbestos, or, natural or artificial rubber, may be used in the location of the joinder.

The gas to be cleaned enters the separator housing 1 through the tube 5 which is welded to the outer shell of the housing, and said gas leaves the housing through the tube 6 which is welded to the top 2. An internal casing 7 having a closed top is fastened to the tube 6 in any suitable manner and a horizontal bottom 8 is secured to the casing 7. A circular directional baffle 9 is fastened to the exterior of the casing 7, and blades 10 are secured to the outer circumference of the lower end of the tube 6. A central tube 11 for the dust collection chamber 11ᵃ is fastened to the bottom 3, and blades 12 are secured to the outer circumference of the tube 11. The vanes 13 are secured on their interior to the tube 11. The tube 11 is provided with a tapered cone 14 which forms a chamber 15. This tapered cone is fastened to the exterior of the vanes 13.

In the operation of the apparatus, the gas enters the passageway 16 of the separator housing through the tube 5 and is caused to flow around the said peripheral passage 16 by the baffle 9. The temperature of the gas is lowered by contact with the radiating exterior surface 1 of the housing which is exposed to the atmosphere. The gas then passes into chamber 17 at the lower part of the housing 1. As the gas thus flows through the apparatus some of the larger particles of the dust or dirt in the gas are deposited in the base of this chamber 17 and then the gas flows upward, as indicated by the arrows, between the passage 15 formed through cone 14 and the wall of the tube 11, and a whirling centrifugal motion is established in the gas stream as it passes the angular blades 12 attached to the central tube 11. The heavier dust particles are then caused to be hurled over the top edge 18 of the cone 14, and said dust particles pass out through the annular dust collecting chamber 19 in the casing 7 and settle on the horizontal bottom 8 of the casing. The gas then reverses its direction of flow, as shown by the arrows, after passing the blades 12 and flows downward through the passage 20 formed between the wall of tube 11 and the wall of the outflow conduit 6 and an additional whirling centrifugal motion is imparted to the gas as it passes the blades 10 and said blades function to throw solid particles in the gas to the outside and verses its direction of flow and flows out of the apparatus through the tube 6.

For cleaning the three dust compartments 17, 19 and 11a of the cleaner apparatus filter construction, the fastening bolts, indicated generally at 4, are caused to be unfastened and the bottom 3 of the separator housing is lowered. The parts 11 and 14 being secured to the bottom portion 3 are lowered when said bottom is removed from the apparatus. Most of the dust or dirt deposited in the chamber 19 will then drop out and the small quantity which might be left on the bottom 8 of the casing can be easily removed by hand. The bottom 3 when removed can then be turned upside down and the dust or dirt collected therein can be emptied from the bottom. The bottom is then returned to its resealed position with respect to the main chamber 1 and the cleaned apparatus is again ready for further service.

From the above description it can be seen that the gas cleaning apparatus of my invention has several distinct advantages. Large quantities of dirt or dust can be collected in the apparatus without interfering with the cooling benefits which are derived from the exterior surface thereof. Furthermore, the particular construction of the apparatus affords an extremely simple method of servicing and cleaning the same. Also, large quantities of dirt may be collected in the cleaning apparatus before servicing becomes necessary thus extending the intervals of time between cleaning periods. When the apparatus is used as a preliminary gas cleaner on a gas producer apparatus, the construction will function to lower the temperature of the gas and also to remove a major part of the suspended solids in the gas and this will reduce the amount of work that must be performed by the final gas cleaning apparatus used with said gas producer apparatus.

What is claimed is:

1. A gas cleaner apparatus comprising a separator housing having a closed top and a removable bottom closure, a gas inflow conduit communicating with the said housing, a hollow casing having a closed top and a closed bottom formed with a central opening therethrough and mounted in said housing so that its side wall and the wall of the housing form a gas passageway, a gas outflow conduit extending through the top of the separator housing and communicating with said casing, and a tube having a tapered cone position around the upper portion thereof mounted on the removable bottom closure of the separator housing which extends upwardly through the central opening in the bottom of the casing and which forms gas passageways through the casing and also provides dust collecting compartments in the casing and the separator housing when the said closure is in closed position with respect to said housing.

2. A gas cleaner apparatus comprising a cylindrical separator housing having a closed top and a removable bottom closure, gas inflow and outflow conduits communicating with said housing, a cylindrical hollow casing having a closed top and a bottom provided with a central opening therethrough and said casing being mounted in said housing so that its side wall and the side wall of the housing provide a gas passageway therebetween, a cylindrical tube mounted on said removable bottom closure of the separator housing having a tapered cone surrounding the upper portion thereof and secured thereto so that it is spaced therefrom, said tube and tapered cone being adapted to be inserted through the central opening in the bottom of the casing and to provide gas passageways through said casing and also to form a dust collecting compartment in the casing when the closure is in place with respect to the separator housing, and means positioned in the gas passageways formed in the separator housing and casing for setting up a whirling motion of the gas passing therethrough.

3. A gas cleaner apparatus comprising a separator housing having a closed top and a removable bottom closure, a gas inflow conduit communicating with said housing, a hollow casing having a closed top and a bottom formed with a central opening therein, said casing being secured within the housing at the upper portion thereof, a gas outflow conduit extending through the top of said separator housing and communicating with said casing, an upwardly extending tube secured to the central portion of said removable bottom of the housing, a plurality of horizontally extending vanes secured to the outer periphery of said tube, a tapered cone positioned so that it surrounds said tube and in spaced relation thereto, the lower portion of said cone being secured to the outer edges of said vanes, said cone being adapted to be received through the opening formed in the bottom of said casing and in conjunction with said tube to form gas passageways through said casing, and means mounted on the exterior of the casing, the exterior of the tube and the exterior of the lower end of the gas outflow conduit to set up a whirling motion of the gas when it flows through the separator housing and casing.

4. A gas cleaner apparatus comprising a separator housing having a closed top and a removable bottom closure, a gas inflow conduit communicating with said housing, a hollow casing having a closed top mounted in the housing and separated from the wall thereof, a closed bottom for said casing having a central opening formed therethrough, a gas outflow conduit projecting through the closed top of said separator housing and extending into said casing, a tube having a tapered cone positioned around the upper portion thereof mounted on the removable bottom closure of the separator housing which extends upwardly through the central opening in the bottom of said casing when the bottom closure of the housing is in its closed position, and which provides gas passageways in the casing and dust collecting compartments in the housing and in the casing, and means positioned in the gas passageways formed in the housing and in the casing for setting up a whiling motion of the gas as it flows through the apparatus.

5. A gas cleaner apparatus comprising a separator housing having a closed top and a removable bottom closure, a gas inflow conduit communicating with said housing, a hollow casing having a closed top secured within the upper portion of said housing and so that there is provided a gas passageway between its side wall and the wall of the housing, a bottom closure for said casing having a central opening therethrough, a gas outflow conduit extending through the top of said housing and communicating with the interior of said casing, a cylindrical hollow tube secured to the central portion of the removable bottom closure of the housing and having a plurality of horizontally extending vanes secured to the outer periphery thereof, a tapered hollow cone secured to the exterior edges of said vanes and positioned so that it surrounds the upper portion of said tube and in spaced relation thereto, said cone and the upper portion of said tube being received in said casing through the central opening in the bottom of said casing when the bottom closure of the housing is in its closed position, said cone and tube when in position with respect to said casing forming passageways through the casing through which the gas entering the housing will flow, said cone and tube also forming separate dust compartments in the housing in which dust present in the gas will be deposited as the gas flows through the housing and casing, and means secured to the exterior of the casing, the exterior of the tube and the exterior of the lower end of the outflow tube for setting up a whirling motion of the gas as it flows through the apparatus.

GEORGE H. WOLFE.

Certificate of Correction

Patent No. 2,392,872.  January 15, 1946.

GEORGE H. WOLFE

It is hereby certified that errors appear in the printed specification of the above numbered patent requiring correction as follows: Page 1, second column, lines 35 and 36, strike out the words "between the passage 15 formed through" and insert instead *through the passage 15 formed between the*; page 2, first column, lines 4 and 5, strike out "filter construction"; and second column, line 55, claim 4, for "whiling" read *whirling*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.* to, said cone and the upper portion of said tube being received in said casing through the central opening in the bottom of said casing when the bottom closure of the housing is in its closed position, said cone and tube when in position with respect to said casing forming passageways through the casing through which the gas entering the housing will flow, said cone and tube also forming separate dust compartments in the housing in which dust present in the gas will be deposited as the gas flows through the housing and casing, and means secured to the exterior of the casing, the exterior of the tube and the exterior of the lower end of the outflow tube for setting up a whirling motion of the gas as it flows through the apparatus.

GEORGE H. WOLFE.

Certificate of Correction

Patent No. 2,392,872. January 15, 1946.

GEORGE H. WOLFE

It is hereby certified that errors appear in the printed specification of the above numbered patent requiring correction as follows: Page 1, second column, lines 35 and 36, strike out the words "between the passage 15 formed through" and insert instead *through the passage 15 formed between the*; page 2, first column, lines 4 and 5, strike out "filter construction"; and second column, line 55, claim 4, for "whiling" read *whirling*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*